United States Patent [19]

Morin

[11] 4,265,425
[45] May 5, 1981

[54] FLOW CONTROL DEVICE

[75] Inventor: Marius J. Morin, Rancho Palos Verdes, Calif.

[73] Assignee: Cutter Laboratories, Inc., Berkeley, Calif.

[21] Appl. No.: 957,778

[22] Filed: Nov. 6, 1978

[51] Int. Cl.³ .............................................. F16K 7/06
[52] U.S. Cl. ...................................................... 251/9
[58] Field of Search .......................... 251/4, 6, 8, 9, 10

[56] References Cited

U.S. PATENT DOCUMENTS

| 2,519,909 | 8/1950 | Johnson | 251/10 |
| 3,544,060 | 12/1970 | Stoltz et al. | 251/9 |

FOREIGN PATENT DOCUMENTS

| 1206243 | 8/1959 | France | 251/9 |
| 7308538 | 12/1974 | Netherlands | 251/7 |

Primary Examiner—William R. Cline
Assistant Examiner—H. Jay Spiegel
Attorney, Agent, or Firm—Robert E. Allen

[57] ABSTRACT

An improvement in a flow control device for permitting fine adjustment of flow rates of fluid in tubing and maintaining established rates of flow. The device includes a clamping member pivotally mounted adjacent a clamping surface and a tubing-engaging surface on the clamping member which progressively closes the orifice of tubing as the clamping member is rotated in one direction. Coacting means on the clamping member cooperate with actuating means on a force-inducing member mounted for rotational movement on the body of the device. The coacting means is located at a point from the point of pivotal attachment of the clamping member which is at least twice the distance from the pivotal attachement to the tubing-engaging surface. Thus a large movement at the coacting point translates into a small movement of the tubing-engaging surface and results in fine adjustment of flow rates. Preferably, the device includes a segment of elastomeric tubing which is secured within the device on which the clamping surfaces react.

16 Claims, 30 Drawing Figures

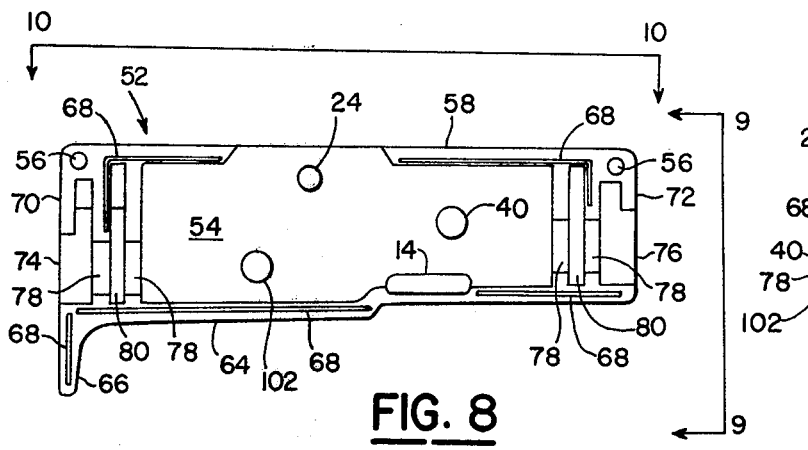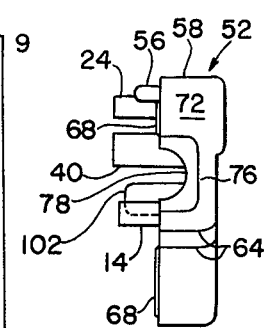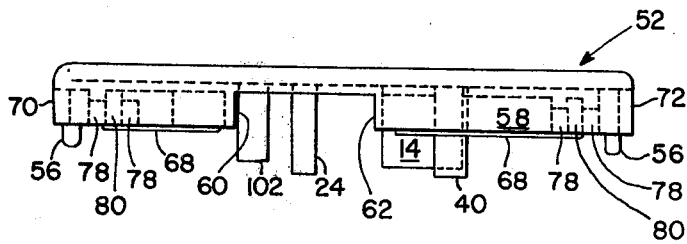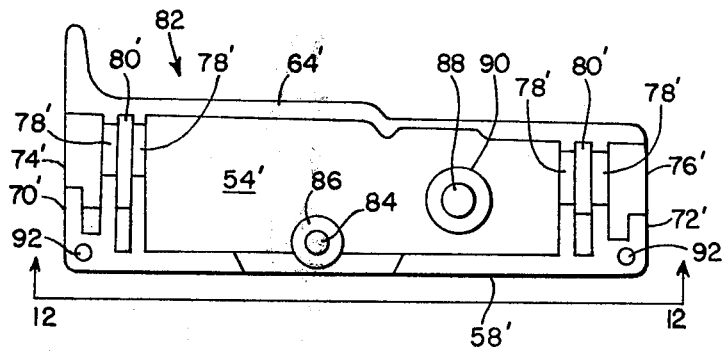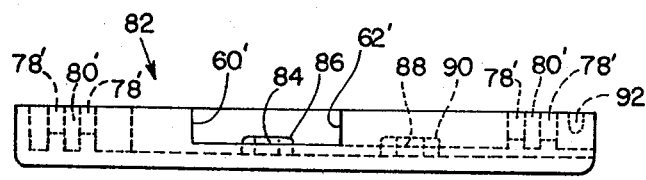

FLOW CONTROL DEVICE

BACKGROUND OF THE INVENTION

1. Field

This invention relates to an improved flow control device and in particular for a device for regulating the flow of liquid passing through flexible tubing which permits very fine adjustment to changes in rates of flow.

2. Prior Art

A great many flow control devices have been disclosed, particularly of the types which have means for compressing the walls of flexible tubing. Some utilize the action of a cammed surface against the tubing to achieve variable compression as a means for varying the flow rate. Typical of such devices are shown in U.S. Pat. Nos. 3,289,999; 3,299,904; 3,477,454; 3,625,472; 3,805,830; 3,813,077 and 4,034,773. Another type which employs the action of a screw is shown in U.S. Pat. Nos. 3,477,686 and 3,584,830. Still another type which utilizes a hinged lever whose free end is urged against tubing is illustrated in U.S. Pat. Nos. 3,497,175; 3,612,474 and 4,091,815. The most common flow control devices in use currently in the medical field are those which are termed roller clamps similar to those shown in U.S. Pat. Nos. 3,099,429; 3,685,787 and 3,802,463.

One of the chief deficiencies of these afore-mentioned devices resides in their inability to allow small differences in the rate of flow to be effected. For example, in roller clamps used on parenteral solution administration sets, the roller is in direct contact with the tubing and the distance a roller is moved on the tubing between a setting for delivery of several hundred milliliters of solution to a setting for just a few milliliters per hour is only fractions of an inch. This makes it extremely difficult if nigh impossible for a nurse to change an established flow rate to a rate which is only slightly greater or slightly less. This is a source of constant annoyance and often leads to a solution being delivered too rapidly or too slowly which can be detrimental to the patient. Another problem associated with clamped tubing, particularly with polyvinyl chloride tubing, is the change in flow rate from a preset rate because of the property of "cold flow" associated with such tubing when under compression. Still another deficiency of roller clamps is the difficulty in establishing a particular flow rate. The axle of the roller rides in the grooves on the side walls and normally the grooves are made larger than the axle so the roller will move easily. However, when an operator pushes the roller with his thumb to set the roller at a particular position, as he releases his thumb, the roller is forced upwardly very slightly by the compressed tubing so that a greater flow results over what existed when his thumb was on the roller.

Another problem with roller clamps is that the roller can occasionally become dislodged from a preset position by relatively gentle tugs on the tubing from inadvertent movements of the patient. This could open up the tubing orifice and produce too rapid an infusion which could be extremely detrimental.

These and other deficiencies are eliminated with an improved flow control device of the present invention as herein disclosed.

SUMMARY OF THE INVENTION

In general terms the flow control device of the present invention comprises a body member to which are pivotally attached a clamping member and a force-inducing member, the latter member having actuating means cooperating with coacting means on the clamping member. The clamping member has a tubing-engaging surface remote from the coacting means and this surface is positioned adjacent a clamping surface integral with the body member. The clamping surface and the tubing-engaging surface have configurations which cause tubing placed between them to be progressively compressed as the clamping member is rotated in one direction. Inherent in the invention is the requirement that in the clamping member the distance from the coacting means to the point of pivotal attachment should be at least about twice the distance from the point of pivotal attachment and the tubing-engaging surface. Preferably this ratio is about four to one or more. This assures that a tube-clamping device made according to this requirement will at least double the sensitivity in flow rate adjustment over that which is possible with current flow control devices such as roller clamps.

The force-inducing member is any device or object which can be pivotally or rotationally moved by an operator's thumb or finger(s) and which has means for actuating the clamping member via its coacting means. This arrangement avoids any changes in flow rates during the process of establishing flow rates by the exertion of pressure by the operator's thumb or finger on the force-inducing member.

The configuration of the clamping member can take any number of shapes as long as the above stated requirement is fulfilled. For example, the clamping member can take the shape of a cogged wheel with a cammed hub projecting from one side of the center pivot, the hub having a diameter one-half or less than the diameter of the wheel. The cammed hub in this instance provides the tubing-engaging surface and the cogs provide the coacting means. The force-inducing member can take the shape of a roller, for example, having actuating means in the form of a circumferential row of teeth for meshing with the cogs. Preferably a force-inducing member has actuating means which translate a larger rotational movement into a smaller movement, as for example the roller could have a projecting hub portion whose diameter is less than the diameter of the roller, the circumferential row of teeth being located on this hub portion.

Another embodiment of a preferred form of the present invention comprises a clamping member in the shape of a lever having a short projection and a long projection relative to the point of pivotal attachment. Preferably the two projections form an acute angle close to 90 degrees. The end of the short projection is located over the clamping surface and is shaped so that movement of the long projection in one direction results in progressive squeezing of tubing placed between the clamping surface and the short projection. The force-inducing member in this embodiment comprises a roller pivotally attached so that a side faces the long projection. This side of the roller has a spiralling groove which accommodates a pin projecting from the end of the long projection of the clamping member. As the roller is moved the pin rides in the groove and causes the long projection of the clamping member to move down or up depending on where the pin is riding in the groove. This action causes the tubing-engaging surface of the short projection to approach or move away from the clamping surface and thus close or open the orifice of tubing placed between them.

In this embodiment of the flow control device, the spiral groove preferably has about two to two and a half revolutions which allows the roller to be moved in effect for about 720 to about 900 degrees. This has been found to be particularly suitable for a flow control device for regulating rates of flow of parenteral solutions through plastic tubing of administration sets. With tubing commonly employed for this purpose, typically having an internal diameter of about 0.12 inch and a wall thickness of about 0.025 inch, it has been found that regardless of what kind of tubing clamp is used, the distance between the two walls being compressed from a position where the flow rate is about 100 drops per minute (approximately 300 ml./hr.) to where the walls are compressed to completely stop the flow of fluid is about 0.015 inch. It is characteristic for plastic tubing to have wall thickness vary from lot to lot so that the gap between two compressed walls may be greater or smaller than 0.015 inch in a clamp such as the roller clamps now in use which are designed for closing a gap of 0.015 inch. As a result, the gap may not be completely closed (when tubing walls are too thin) or the gap may be closed too quickly with little opportunity for flow rate adjustment (when tubing walls are too thick). The preferred embodiment of a flow control device of this invention just described is particularly accommodating to wide variations of tubing wall thickness. In a typical working example where the roller with a diameter of about 0.5 inch had about two and a half revolutions in its spiral groove, it was found that about 140 degrees rotation of the roller was required to effect closure of a gap of 0.015 inch in the tubing. Since the roller had an effective range of about 900 degrees, it is readily apparent that tubing with thinner walls is closed by a span of 140 degrees falling well within the upper portion of the 900 degree range and conversely, tubing with thicker walls is closed well within the lower portion of the 900 degree range. This wide range also accommodates to slight dimensional variations in the clamping member or other parts of the device which can affect tubing closure.

One of the unique features of the embodiment just described is that the spiral arrangement of the groove in the roller results in an increase in the sensitivity of flow rate adjustment in the direction of decreasing flow rates. This is a consequence of the clamping member being activated by an increasingly larger diameter arc of the groove as the tubing is being compressed. This feature is particularly desirable in the adjustment of very low infusion rates for parenteral solutions. With the flow control device of this invention it is possible to readjust flow rates easily and quickly to another flow rate differing only by a few milliliters per hour.

Flow control devices of the present invention with any degree of sensitivity for flow rate adjustment can be obtained by merely changing the size of the force-inducing member relative to the dimensions of the clamping member or, alternatively, enlarge the distances ratio requirement for the clamping member, or a combination of both.

The invention further includes improvements to avoid the problem of accidental disruption of established flow rates and also to minimize changes or drift in flow rates commonly encountered due to "cold flow" when tubing such as polyvinyl chloride (PVC) tubing is compressed. A segment of tubing is isolated from the tubing exterior of the flow control device by means of securement members connecting the segment with the exterior tubing. The securement members are locked in sealing engagement with the body member so that any stretching of the tubing exterior of the device is not transmitted to the segment of tubing within the device. This prevents disruption of flow rate established by the device. The segment of tubing is preferably made of elastomeric material such as silicone rubber and the like which is more resilient than PVC tubing and is not as susceptible to "cold flow" when compressed. Flow rate drifts of very low magnitude are achieved with such a device, i.e., about 5 to 10 percent over a wide range of flow rate settings. Typical drifts in flow rates for roller and screw clamps currently in use on PVC tubing are of the order of about 20 to 60 percent.

BRIEF DESCRIPTION OF THE FIGURES

FIG. 8 is a side view of one half of the body member of the device in FIG. 1.

FIG. 9 is an end view of FIG. 8 taken along the line 9—9.

FIG. 10 is a top view of FIG. 8 taken along the line 10—10.

FIG. 11 is a side view of the other half of the body member of the device of FIG. 1.

FIG. 12 is a top view of FIG. 11 taken along the line 12—12.

DETAILED DESCRIPTION OF PREFERRED EMBODIMENTS

Figure 1:
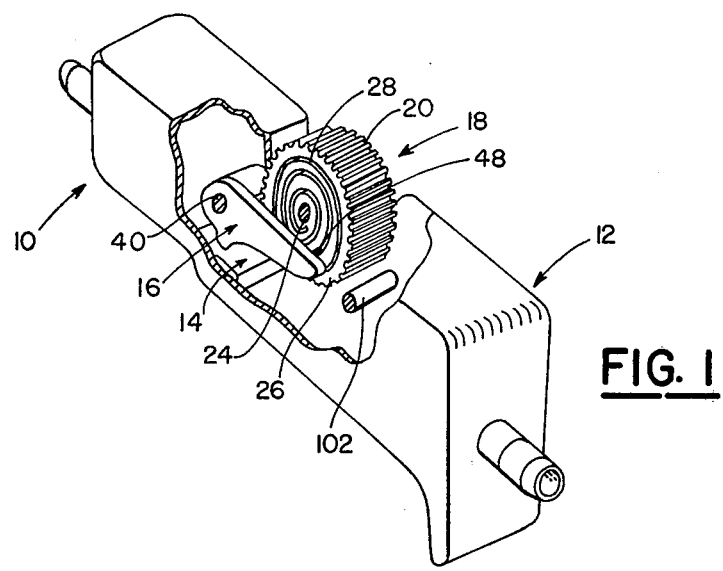
FIG. 1 shows a view in perspective of a flow control device of the present invention, partially cut away to show the relationship of the functional parts.

Referring to FIG. 1, a flow control device 10 is shown comprising a body member 12 through which flexible plastic tubing (not shown) is extended longitudinally. Device 10 includes a clamping surface 14, a clamping member 16, and a force-inducing member 18.

Figure 2:
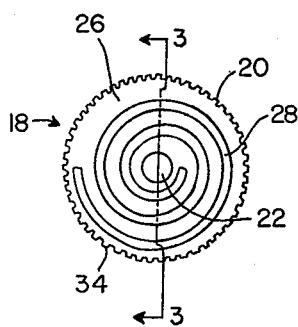
FIG. 2 is a view of one side of the roller shown in FIG. 1.
Figure 3:
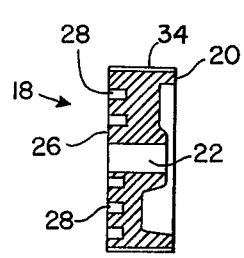
FIG. 3 is a view in cross-section of FIG. 2 taken along the line 3—3.
Figure 4:
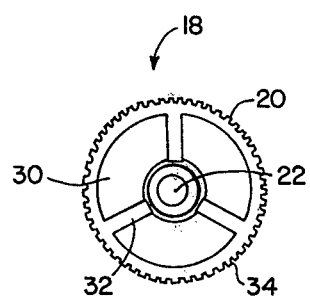
FIG. 4 is a view of the other side of the roller of FIG. 1.

The force-inducing member 18 in this embodiment is shown in greater detail in FIGS. 2-4 and consists of a flat cylindrical body or roller 20 with an opening 22 in the center to accommodate a peg 24 which extends from a side wall of the body member 12. One side 26 of the roller 20 has a groove 28 which spirals from a point near the periphery to a point near the opening 22. As shown in FIG. 2, the groove 28 extends for two and one-half revolutions although grooves spiralling over larger or shorter distances are also possible. The other side 30 of roller 20 preferably is indented with a number of reinforcing ribs 32 and the peripheral edge of the roller has a plurality of knurls 34 to provide a roughened surface for an operator's thumb to make better contact.

Figure 6:
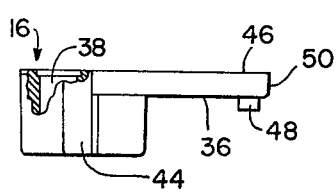
FIG. 6 is a view in partial cross-section looking down on the clamping member of FIG. 5.
Figure 5:
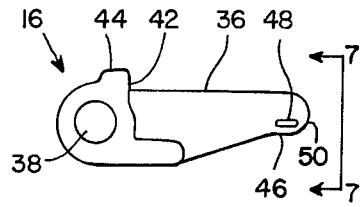
FIG. 5 is a side view of the clamping member in the device of FIG. 1.
Figure 7:
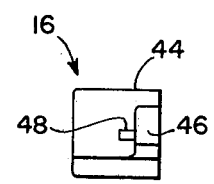
FIG. 7 is an end view of the clamping member of FIG. 5 taken along the line 7—7.
Figure 13:
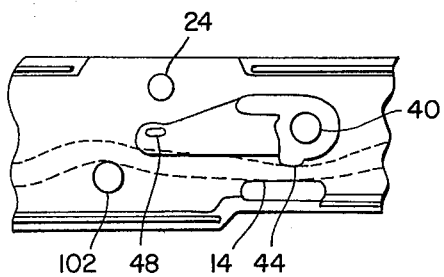
FIG. 13 is a portion of FIG. 8 with the clamping member installed and shown in a position in which tubing (shown in phantom) is only slightly compressed.
Figure 14:
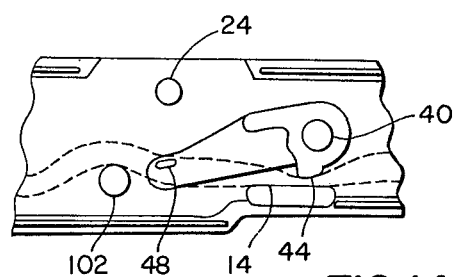
FIG. 14 is a view similar to that shown in FIG. 13 but with the clamping member in a position which completely closes off the tubing.

The clamping member 16 best seen in FIGS. 5-7 consists of an angular body 36 having an opening 38 to accommodate a peg 40 extending from a side of the body member 12. A short projection 42 located near opening 38 has a tubing-engaging surface 44 extending transversely and adapted to cooperate with the clamping surface 14 in the compression of tubing positioned between these two surfaces. Clamping member 16 has a long projection or arm 46 with a pin 48 located at its outer end 50 and with the pin 48 extending inwardly and parallel with the tubing-engaging surface 44. When the roller 20 and the clamping member 16 are placed on pegs 24 and 40, respectively, as shown in FIG. 1, pin 48 rides in groove 28. When the pin 48 is at a position near the inner end of the groove 28, the clamping member 16 is positioned as shown in FIG. 13 (the roller 20 is not shown for sake of clarity). Tubing, shown in phantom, is only slightly compressed between tubing-engaging surface 44 and clamping surface 14, and flow of fluid through the tubing is essentially unimpeded. When the roller is moved in a direction whereby pin 48 travels in groove 28 outwardly toward the periphery of the roller, the clamping member pivots about peg 40 and causes the tubing-engaging surface 44 to move closer to clamping surface 14 as shown in FIG. 14. The walls of the tubing are thus progressively compressed to decrease the rate of flow of fluid passing through it.

The distance from pin 48 to the point of pivotal attachment of the clamping member 16, i.e., the center of opening 38, is approximately four times the distance from this point and the tubing-engaging surface 44. This in effect translates a movement of the outer end of arm 46 travelling up or down a certain distance into a movement of the tubing-engaging surface travelling up or down a distance only about one-fourth as great. This unique arrangement results in the flow control device having the capability of being adjusted by a relatively larger movement of the roller and yet produce small increases or decreases in flow rates.

It is to be noted that in this embodiment of the device, the surface 44 and pin 48 form an angle of a little less than 90 degrees in relation to the point of pivotal attachment of the clamping member. This spatial relationship can vary to other angular configurations where the angle is greater or smaller as long as the clamping surface 14 is positioned generally parallel to the tubing-engaging surface 44.

The body member 12 is made in two mating parts in order to assemble the functioning components within it. FIGS. 8-10 shows one-half 52 of body member 12 with clamping surface 14 integral with and extending outwardly from near the bottom of side 54. Peg 24 on which roller 20 is supported for rotational movement also extends from side 54 parallel to clamping surface 14. Likewise peg 40 extends from side 54 parallel to peg 24 and supports clamping member 16 for pivotal movement. Two pins 56 project from upper corners of top wall 58 and serve to align body half 52 with the other body half 82. The top wall 58 has an opening formed by indentations 60, 62 which forms part of the entire opening when the two halves are mated to allow a portion of roller 20 to project above top wall 58. Bottom wall 64 has a projecting tab 66 at one end acting as a stop for the fingers when the device 10 is held. Certain portions of the top, sides and bottom walls can have a thin bead 68 for welding halves 52 and 82 together by heat-generating means such as ultrasonic energy.

End walls 70, 72 have openings 74, 76 through which the tubing extends. Preferably the portions of the body member adjacent openings 74 and 76 have a structure designed for securing or locking in a section of tubing encased by the body member 12. In this embodiment, this structure comprises hemi-circular slots 78 on each side of a larger slot 80.

The other half 82 is constructed as a mirror image of half 52 with respect to side, top, bottom and end walls 54', 58', 64', 70', and 72', respectively. Half body member 82 also has correspondingly located slots 78' and 80' as well as openings 74' and 76' at the end walls 70' and 72', and an opening in top wall 58' created by indentations 60', 62'. A well 84 formed by a circular ridge 86 retains the end of peg 24 and a well 88 formed by ridge 90 retains the end of peg 40 when the two halves are mated. Circular slots 92 retain pins 56 for aligning the two halves 52 and 82 together.

Figure 15:
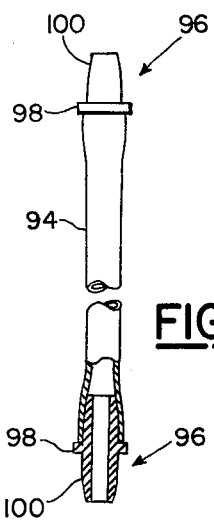
FIG. 15 shows a section of flexible tubing with adaptors which may be secured within the body member of a flow control device of this invention.
Figure 16:
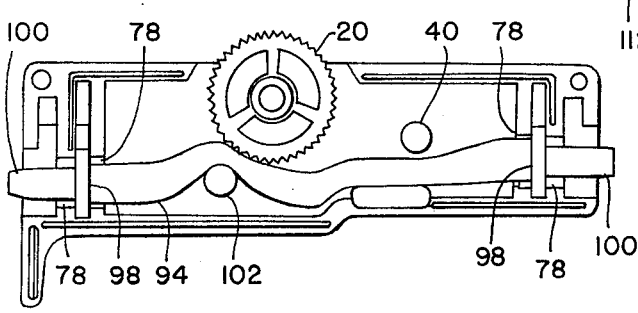
FIG. 16 shows the section of tubing of FIG. 15 fitted into one-half of the body member and its relationship to the roller.

The preferred structure of device 10 which has slots for securing a section of tubing also has this section of tubing 94 as part of the device. As shown in FIGS. 15 and 16, tubing section 94 is secured at each end to a tubular adapter 96, the central portion of which has an annular ridge 98. When the tubing section 94 with attached adapters 96 is placed between the two halves 52 and 82, ridge 98 fits into the two slots 80, 80' and the portions of tubing and/or adapter on each side of ridge 98 is engaged by slots 78, 78' in the body member 12. The tubing section is then locked in and this section is isolated from stretching forces on tubing exterior of device 10 which is attached to outer ends 100 of the adapters 96. This section of tubing 94 can be made of any flexible plastic but preferably is elastomeric such as silicone rubber or the like.

Device 10 advantageously has a peg 102 located below roller 20 which extends parallel to peg 24 supporting roller 20. Tubing 94 is compressed slightly between peg 102 and roller 20 but does not restrict flow of fluid. The frictional engagement and slight compression of the tubing against the edge of the roller serves to act as a slight braking effect to help prevent inadvertent movement of the roller after a flow rate has been established.

Figure 17:
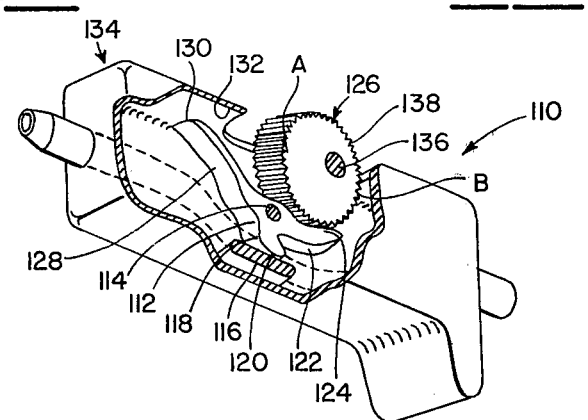
FIG. 17 is a view in perspective illustrating another embodiment of a flow control device of this invention, with part of the body member cut away to show the relationship of the functional parts.

FIG. 17 shows another embodiment of a flow control device 110 which also illustrates the principle of the invention. In this embodiment a clamping member 112 is pivotally attached by a peg 114 and is positioned over clamping surface 116 in a manner similar to device 10. Clamping member 112 has a short extension 118 with a tubing-engaging surface 120 and a longer extension 122 whose end 124 coacts with a force-inducing member or roller 126. Clamping member 112 also has a long slender arm 128 extending generally in a direction away from extensions 118 and 122 and its outer end 130 is adapted to contact and press against top 132 of body member 134 when end 124 of extension 122 is forced downwardly. Roller 126 is pivotally attached to a peg 136 off center of the roller which in effect provides a cammed surface 138 between points A and B on the outer edge of the roller. As the roller is moved from B to A, it activates extension 122 on clamping member 112 and forces it downward, causing tubing-engaging surface 120 to progressively compress tubing (shown in phantom) against the clamping surface 116. Arm 128, which presses against top wall 132, acts as a spring and helps to urge extension 122 in an upward direction when the roller is moved from A to B. As in the clamping member 16 of device 10, the distance between the coacting end 124 of extension 122 and peg 114 is at least twice and preferably is about four times the distance between peg 114 and tubing-engaging surface 120. It is apparent that the roller functions through approximately 180 degrees in the process of closing tubing from an essentially completely open to a completely closed condition.

Figure 18:
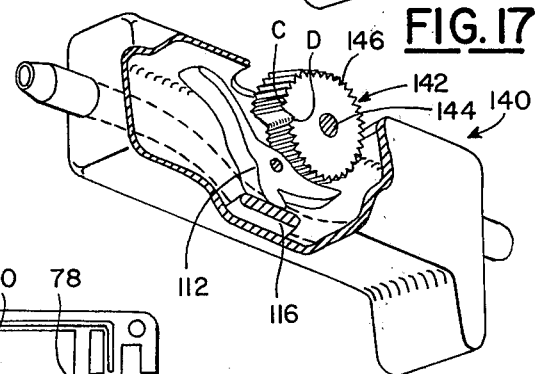
FIG. 18 is a view similar to FIG. 17 of another embodiment of a flow control device.

FIG. 18 illustrates a flow control device 140 which is quite similar to device 110 except that the force-inducing member or roller 142 is pivotally attached at its center to a peg 144 and the outer edge 146 is cammed over substantially 360 degrees between points C and D. In other words, as roller 142 is moved from point D to point C, tubing becomes progressively compressed. This version of the flow control device essentially doubles the sensitivity for flow rate adjustment over that of device 110.

Figure 19:
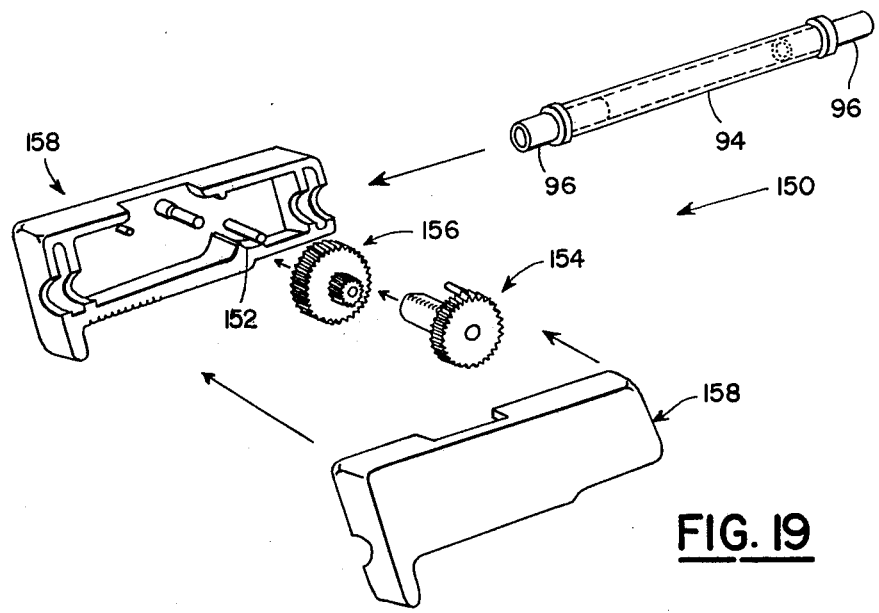
FIG. 19 is an exploded view in perspective of still another embodiment of a flow control device of this invention.
Figure 20:
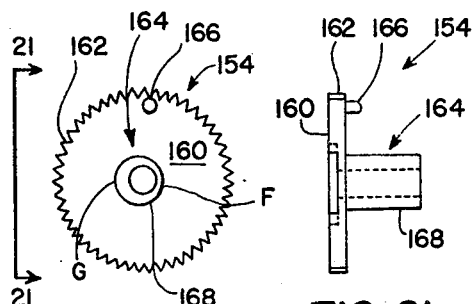
FIG. 20 is an end view of the clamping member in the device of FIG. 19.
Figure 21:
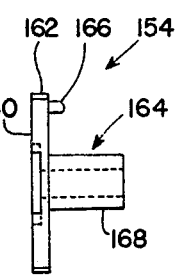
FIG. 21 is a side view of FIG. 20 taken along the line 21—21.
Figure 22:
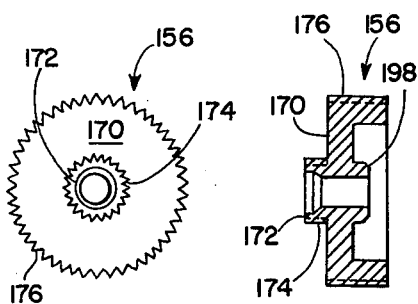
FIG. 22 is an end view of the roller in the device of FIG. 19.
Figure 23:
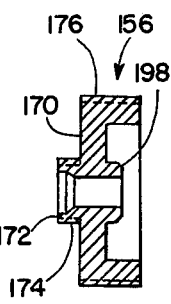
FIG. 23 is a side view in cross section of the roller in FIG. 22.

Flow control device 150 as shown by an exploded view in FIG. 19 is still another version applying the principle of this invention. Certain parts are similar in the two halves of the body member as in device 10, hence these will be accorded the same numerical designation. Device 150 likewise has a clamping surface 152, a clamping member 154 and a force-inducing member 156 which are adapted for progressively compressing tubing, preferably a section of tubing 94 secured by adaptors 96 locked into body member 158.

Figure 24:
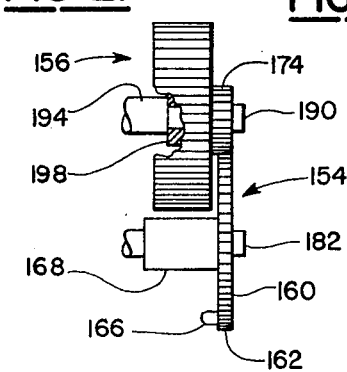
FIG. 24 shows a side view of the clamping member and roller in cooperative arrangement in the device in FIG. 19.

Clamping member 154 comprises a disc-like member 160 with a multiplicity of cogs or teeth 162 on the periphery and a hollow tubular hub 164 projecting from the center on one side. A stop pin 166 projects from the same side near the periphery of disc 160. Hub 164 has a cammed surface 168 acting as the tubing-engaging surface which is closest to the center of disc 160 at point F and furthest at point G. As in the other versions of clamping members, the distance from the coacting means or cogs 162 to the pivotal point or center of disc 160 is at least twice and preferably is about four times or more than the distance between the pivotal point and any point on the cammed surface 168. Force-inducing member 156 comprises a roller 170 having a hub portion 172 projecting from one side at the center and with a series of cogs or teeth 174 around the periphery of the hub portion which are adapted to mesh with the cogs 162 of clamping member 154 as seen in FIG. 24. Roller 170 preferably has a roughened or grooved surface 176 on the periphery.

Figure 25:
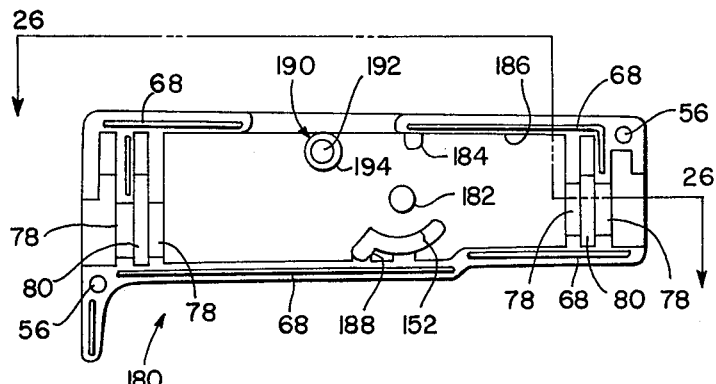
FIG. 25 is a side view of one half of the body member in the device of FIG. 19.
Figure 26:
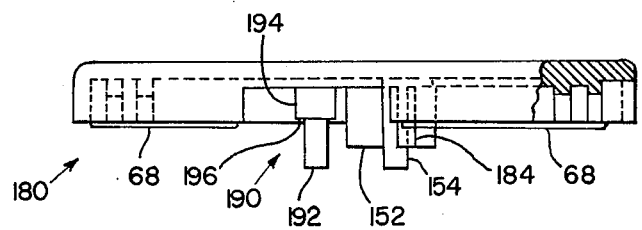
FIG. 26 is a top view of FIG. 25 taken along the line 26—26.
Figure 27:
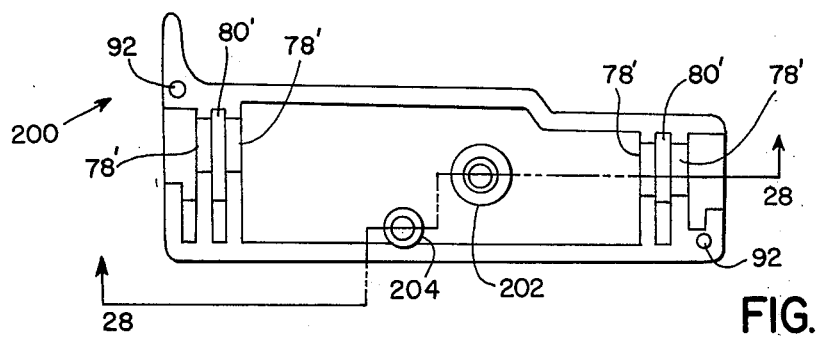
FIG. 27 is a side view of the other half of the body member in the device of FIG. 19.
Figure 28:
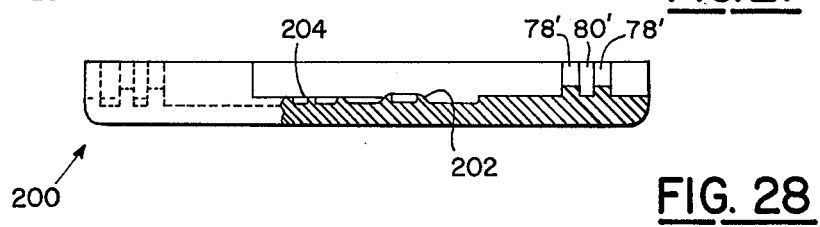
FIG. 28 is a top view of FIG. 27 taken along the line 28—28.

One of the body member halves 180 bears clamping surface 152 and a peg 182 as shown in FIGS. 25 and 26. Peg 182 supports disc 154 for rotational movement over a distance of about 180 degrees in either direction. This limitation of movement is controlled by a disc stop 184 at the top 186 of body half 180 which is intended to coincide with stop pin 166 on disc 154 when the disc moves in the direction towards stop 184. When disc 154 moves in the opposite direction, the stop pin 166 is blocked by ledge 188 on clamping surface 152. This range of about 180 degrees movement coincides with the movement of hub 164 in which the tubing-engaging surface moves a distance of about 180 degrees and progressively compresses tubing between it and the clamping surface 152 from an open to a completely closed condition. Post 190 supports roller 170 for rotational or pivotal movement and has a smaller diameter section 192 on which the roller rides and a larger diameter section 194 with a shoulder 196 which rests against a boss 198 on roller 170 to limit the placement of the roller so that its cogs 174 are an alignment to mesh with the cogs 162 on disc 160.

The other half 200 of body member 158 has a boss 202 for containing the outer end of peg 182 and a boss 204 for containing the outer end of section 192 on post 190. Preferably the two halves 180 and 200 have means for locking in the section of tubing 94 which are similar to the locking means shown in body member halves 52 and 82 of device 10.

Figure 29:
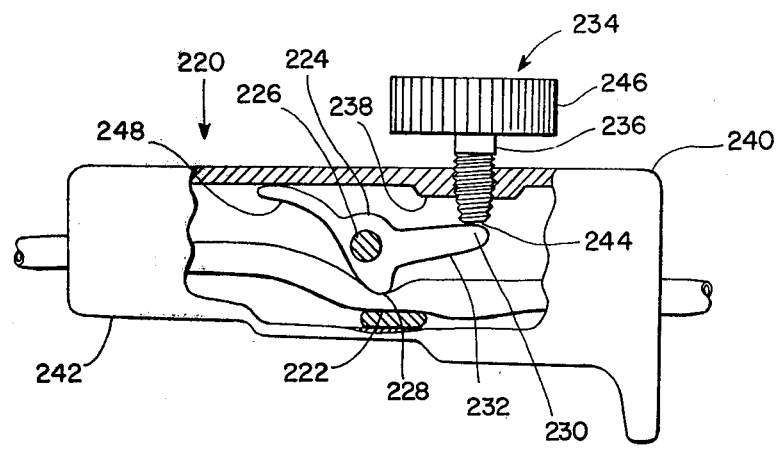
FIG. 29 is a side view of still another embodiment of a flow control device of the present invention, the body portion partly cut away to show the relationship of the functional parts.
Figure 30:
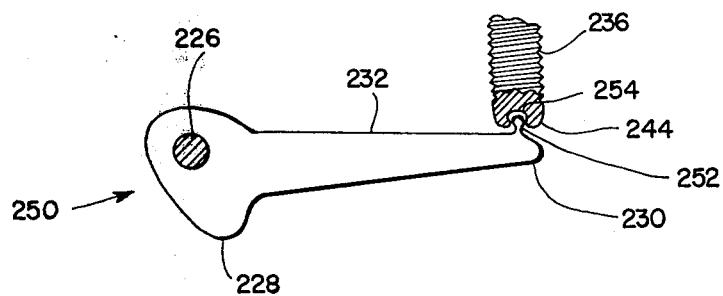
FIG. 30 is a side view of a modified form of the clamping member and a portion of the screw member in the device of FIG. 29.

Another flow control device 220 embodying the principles of this invention is shown in FIG. 29. Device 220 is provided with a clamping surface 222 and a clamping member 224, much like clamping member 112 in device 110, which is pivotally mounted on peg 226. Clamping member 224 has its tubing-engaging surface 228 located at a distance from the pivotal point which is at least less than one-half and preferably about one-fourth or less than the distance from the pivotal point to the coacting end 230 of a long arm 232. A force-inducing member 234 comprises a screw 236 threadedly rotatable within a threaded housing section 238 in the top 240 of body member 242. The end tip portion 244 of screw 236 actuates end 230 of clamping member 224. When knob 246 is rotated clockwise, end 230 of arm 232 is forced downwardly and tubing-engaging surface 228 progressively compresses tubing between it and clamping surface 222. Spring arm 248 on clamping member 224 assists in keeping end 230 in contact with screw end 244 when the knob 246 is turned counterclockwise. This coacting contact between the clamping member and the screw can also be accomplished by the modification shown in FIG. 30. Clamping member 250 has a small knob 252 on end 230 which snap fits into a hollowed circular depression 254 in the end 244 of screw 236. The screw can freely rotate about knob 252 and yet maintain the screw in contact with arm 232 at all times. In this version of clamping member 250, no spring arm is required such as the arm 248 of clamping member 224.

The flow control devices which have been detailed above are generally molded in plastic or any rigid material. The body members preferably are made of material whose heat of fusion is lower than the material from which the clamping members and force-inducing members are made. Generally, the devices are assembled by extending tubing along one of the halves, 52 or 180 for example, which bear the clamping surface, or in the cases where a section of tubing 94 with its adaptors 96 is desired, this is partially locked into place in slots 78 and 80. The force-inducing member and the clamping member are then positioned on their appropriate pegs or posts in a manner such that the tubing is only slightly compressed between the clamping member and the clamping surface. The other halves, 82 or 200 for example, are positioned and the two meeting halves are then sealed together, preferably by ultrasonic welding. In the preferred forms of the devices in which the tubing section 94 is used, tubing from an administration set is then fitted over ends 100 of the adaptors 96 and preferably are solvent bonded to these ends.

A number of examples of the flow control device of the present invention have been disclosed in detail; however, these should be construed as illustrative only and the scope of the invention is intended to be limited only by the claims which follow.

I claim:

1. In a flow control device having a body member with a passage for receiving flexible tubing and which provides a clamping surface for the tubing and having a clamping member associated with the body member for urging the tubing against the clamping surface, the improvement which comprises the clamping member being pivotally attached to the body member and having a tubing-engaging surface, the tubing-engaging surface and the clamping surface having configurations such that rotational movement of the clamping member in one direction causes the tubing to be progressively compressed, the clamping member further comprising an angular body having a first extension and a second extension, the second extension being shorter than the first extension relative to the point of pivotal attachment, the ends of the first and second extensions in relation to the point of pivotal attachment of the clamping member forming an angle of about 90 degrees, the clamping member further having means for coacting with a force-inducing member fixedly mounted on the body member and adapted for rotational movement, the force-inducing member having means for activating the coacting means of the clamping member; the outer end of the second extension bearing the tubing-engaging surface and the outer end of the first extension bearing the coacting means for the clamping member to be actuated by the force-inducing member; the force-inducing member comprising a generally cylindrical body offset to a side on the first extension of the clamping member, the cylindrical body having the activating means on an outer surface for communication with the coacting means, the distance between the coacting means and the pivotal attachment of the clamping member being at least twice the distance between the pivotal attachment and the tubing-engaging surface.

2. In a flow control device having a body member with a passage for receiving flexible tubing and which provides a clamping surface for the tubing and having a clamping member associated with the body member for urging the tubing against the clamping surface, the improvement which comprises the clamping member being pivotally attached to the body member and having a tubing-engaging surface, the tubing-engaging surface and the clamping surface having configurations such that rotational movement of the clamping member in one direction causes the tubing to be progressively compressed, the clamping member having means for coacting with a force-inducing member mounted on the body member and adapted for rotational movement, the distance between the coacting means and the pivotal attachment of the clamping member being at least twice the distance between the pivotal attachment and the tubing-engaging surface, the force-inducing member having means for activating the coacting means of the clamping member, the clamping member further comprising an angular body having a first extension and a second extension, the second extension being shorter than the first extension relative to the point of pivotal attachment, the outer end of the second extension bearing the tubing-engaging surface and the outer end of the first extension bearing the coacting means for the clamping member to be actuated by the force-inducing member; the force-inducing member comprising a generally cylindrical body offset to a side of the first extension on the clamping member and having the activating means on an outer substantially flat surface of the cylindrical body which faces towards the side of the first extension, the actuating means on the outer surface comprising a curved race recessed into the outer surface and extending at least about 360 degrees in an ever-decreasing arc as it progresses from a point near the periphery to a point closer to the point of rotational attachment of the cylindrical body, the coacting means at the end of the first extension comprising a pin which extends towards and into the race.

3. The flow control device of claim 2 wherein the arc of the race extends for about 900 degrees.

4. The flow control device of claim 3 wherein the distance between the means for coaction and the pivotal attachment of the clamping member is at least about four times the distance between the pivotal attachment and the tubing-engaging surface.

5. The flow control device of claim 4 further including a section of flexible tubing which is encased by the body member and is fixed to the body member by securement means at positions on each side of the tubing which is compressed.

6. The flow control device of claim 5 wherein the securement means comprises a tubular adapter having inner and outer ends and an intermediate section, the inner ends being in sealing engagement with the tubing encased by the body member and the outer ends being adapted for sealing engagement with tubing exterior of the body member, the intermediate section having locking means for cooperating with lock-receiving means in the body member.

7. The flow control device of claims 5 or 6 wherein the tubing encased by the body member is made of elastomeric material.

8. The flow control device of claim 5 further having means for supporting an intermediate portion of the tubing whereby peripheral surfaces of the cylindrical body are thereby forced into slight frictional contact with the intermediate portion of tubing.

9. A flow control device for controlling the rate of flow of fluid through flexible tubing comprising:
   a body member with a passage to receive the tubing;
   a clamping surface integral with the body member;
   a clamping member pivotally attached adjacent the clamping surface and having a tubing-engaging surface, the tubing-engaging surface and the clamping surface being contoured in a manner whereby rotational movement of the clamping member in one direction causes the tubing placed between these two surfaces to be progressively compressed, the clamping member further including an extension adjacent to and parallel to the tubing, and a pin projecting inwardly from the outer end of the extension, the distance from the pin to the point of pivotal attachment being at least about twice the distance from the tubing-engaging surface to the point of pivotal attachment; and
   a roller rotationally attached to the body member and having a generally planar surface facing the pin, the planar surface having a curved groove into which the pin extends, the groove describing an extended arc from a point near the periphery of the roller to a point near the point of rotational attachment.

10. The flow control device of claim 9 wherein the arc of the groove extends over a range of about 900 degrees.

11. The flow control device of claims 9 or 10 wherein the distance from the pin to the point of pivotal attachment is at least about four times the distance from the tubing-engaging surface to the point of pivotal attachment.

12. The flow control device of claim 10 wherein the angle between the tubing-engaging surface and the pin relative to the point of pivotal attachment is about 90 degrees.

13. The flow control device of claim 12 further including a section of flexible tubing encased by the body member and which is retained by securement means to the body member at positions on each side of the tubing which is compressed by the clamping member.

14. The flow control device of claim 13 wherein the securement means comprises a tubular adapter having an inner and outer end and an intermediate section, the inner end being in sealing engagement with the tubing encased by the body member and the outer end being in sealing engagement with tubing exterior of the body member, the intermediate section having locking means which cooperate with lock-receiving means in the body member.

15. The flow control device of claim 14 wherein the section of tubing is made of elastomeric material.

16. The flow control device of claim 15 wherein the elastomeric material is silicone rubber.

* * * * *